E. G. CHALKER.
LOCK NUT.
APPLICATION FILED MAR. 6, 1915.
1,164,575.
Patented Dec. 14, 1915.
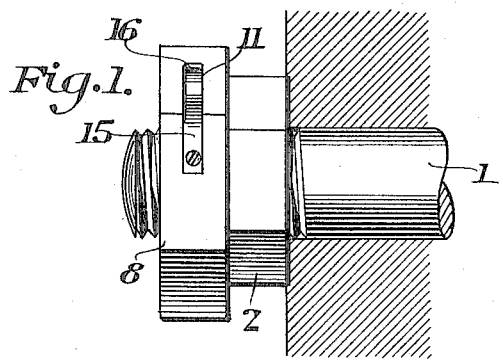
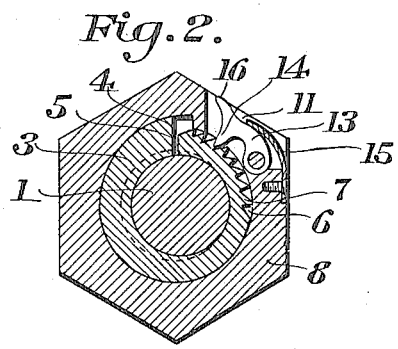
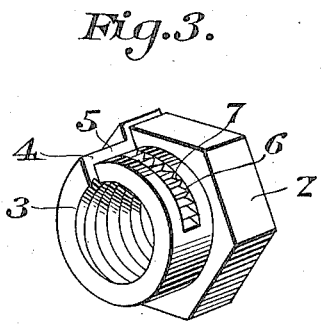
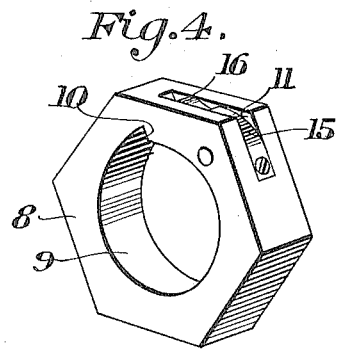
Inventor
E. G. Chalker
Witnesses
By Victor J. Evans
Attorney
COLUMBIA PLANOGRAPH CO., WASHINGTON, D. C.

UNITED STATES PATENT OFFICE.

EDWARD G. CHALKER, OF BANCROFT, MICHIGAN.

LOCK-NUT.

1,164,575.

Specification of Letters Patent.  Patented Dec. 14, 1915.

Application filed March 6, 1915. Serial No. 12,603.

*To all whom it may concern:*

Be it known that I, EDWARD G. CHALKER, a citizen of the United States, residing at Bancroft, in the county of Shiawassee and State of Michigan, have invented new and useful Improvements in Lock-Nuts, of which the following is a specification.

The present invention relates to improvements in lock nuts, and the object of the invention is to provide a simple, comparatively cheap and thoroughly effective device of this character whereby a nut may be easily and quickly locked upon a bolt.

With the above and other objects in view, the improvement resides in the construction, combination and arrangement of parts set forth in the following specification and falling within the scope of the appended claims.

In the drawing: Figure 1 is a view illustrating a bolt having a nut secured thereon in accordance with my invention, Fig. 2 is a sectional view approximately on the line 2—2 of Fig. 1, Fig. 3 is a perspective view of the nut proper, and Fig. 4 is a similar view of the collar or locking member for the nut.

Referring now to the drawings in detail, the numeral 1 designates a bolt of the ordinary construction which has arranged thereon a nut 2. This nut is provided upon one of its faces with an elliptical extension which terminates in a shoulder 4, and both the extension 3 as well as the nut proper is slitted transversely, as at 15, at or adjacent the said shoulder 4. The periphery of the member 3 opposite the shoulder 4 is provided preferably with a centrally arranged annular depression 6, the lower wall of which being formed with transverse teeth 7. The nut engages with the bolt in the ordinary manner, and when the same is screwed home upon the bolt 1, I provide a locking collar 8 which has a peripheral contour corresponding to that of the nut 2 but which has an elliptical boss 9 providing a shoulder 10. The side of the collar 8 arranged opposite the said shoulder 10 is centrally provided with an opening 11 which communicates with its bore 9, and pivotally arranged within the said slot 11, as at 12, is a dog 13. This dog has its engaging end or finger 14 normally forced within the bore of the collar 8 through the medium of a spring 15, and the said dog is further provided with a finger piece 16 disposed opposite its tooth or engaging portion 14. When the collar is arranged upon the spiral periphery of the nut 2, the shoulder 10 is arranged at a suitable distance away from the shoulder 4 of the portion 3 of said nut 2. The engaging tooth 14 of the dog 13 is received within the circumferential depression 6 to engage with one of the teeth 7 therein and the collar is rotated upon the portion 3 of the nut 2 until the shoulder 10 abuts with the shoulder 4, thus closing the slit 5 and compressing the nut 2 tightly against the threads of the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. In a nut lock, a nut having one of its faces provided with a spiral extension, the peripheral wall of the said extension being centrally formed with depressions providing teeth, the nut as well as its extension being slitted transversely, a collar having a spiral bore arranged upon the spiral extension of the nut, a spring pressed dog carried by the collar and engaging with the teeth of the nut extension, as and for the purpose set forth.

2. In a lock nut, a nut having one of its faces provided with a spiral extension terminating in a shoulder and being split transversely adjacent the said shoulder, the peripheral wall of the said extension, adjacent its shoulder, being formed with transverse depressions, a collar having a spiral bore also terminating in a shoulder, a pivoted member arranged upon the said collar and coacting with the depressions in the spiral extension to close the gap in the nut provided by the slit therein, when the said collar is rotated upon the nut in one direction.

3. In a nut lock, a nut having one of its faces provided with a spiral extension terminating in a shoulder, the said nut and extension being slit transversely adjacent the said shoulder, the outer face of the spiral extension being formed with a transverse depression, a rotatable collar upon the spiral extension, and means comprising a spring pressed element carried by the said rotatable collar and co-acting with the depressions in the spiral extensions for closing the gap provided by the slit of the nut when the said rotatable collar is moved in one direction upon the nut.

4. In a lock nut, a nut having one of its faces formed with a spiral extension and terminating in a shoulder, the said nut and extension being slit transversely adjacent the said shoulder, the periphery of the said extension adjacent the shoulder having a central depression, the lower wall of which being formed with teeth, a collar having a spiral bore coinciding with the spiral extension of the nut and adapted to be received upon the said extension, said collar being centrally provided with a slot which communicates with its bore, a spring pressed dog pivoted within the annular depression and to engage with the teeth of the extension of the nut and the said dog having a finger piece arranged within the slot of the collar and disposed adjacent the engaging end of the dog.

In testimony whereof I affix my signature in presence of two witnesses.

EDWARD G. CHALKER.

Witnesses:
E. G. HAY,
H. W. PARKER.

Copies of this patent may be obtained for five cents each, by addressing the "Commissioner of Patents, Washington, D. C."